(12) United States Patent
Alexander et al.

(10) Patent No.: US 8,262,344 B2
(45) Date of Patent: Sep. 11, 2012

(54) THERMAL MANAGEMENT SYSTEM FOR A GAS TURBINE ENGINE

(75) Inventors: Eric J. Alexander, San Diego, CA (US); Mark N. Shatz', San Diego, CA (US); Gordon F. Jewess, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1197 days.

(21) Appl. No.: 12/061,053

(22) Filed: Apr. 2, 2008

(65) Prior Publication Data
US 2009/0252604 A1 Oct. 8, 2009

(51) Int. Cl.
*F02C 7/052* (2006.01)
*F02C 7/12* (2006.01)

(52) U.S. Cl. ................. 415/121.2; 416/94; 60/39.08
(58) Field of Classification Search ............. 415/115, 415/121.2; 416/93 R, 94; 60/772, 39.08, 60/39.092, 39.83
See application file for complete search history.

(56) References Cited

U.S. PATENT DOCUMENTS

| | | | |
|---|---|---|---|
| 2,427,936 A | 9/1947 | Wales, Jr. | |
| 2,594,096 A | 4/1952 | Trigg | |
| 3,574,483 A | 4/1971 | Linden | |
| 3,645,816 A | 2/1972 | Billias et al. | |
| 3,721,507 A | 3/1973 | Monteleone | |
| 4,008,979 A | 2/1977 | Cooper et al. | |
| 4,047,838 A | 9/1977 | Ferris et al. | |
| 4,089,763 A | 5/1978 | Dart et al. | |
| 4,120,610 A | 10/1978 | Braswell et al. | |
| 4,170,437 A | 10/1979 | Korsak | |
| 4,222,835 A | 9/1980 | Dixon | |
| 4,227,856 A | 10/1980 | Verrill et al. | |
| 4,228,062 A | 10/1980 | Lee, Jr. et al. | |
| 4,352,707 A | 10/1982 | Wengler et al. | |
| 4,426,243 A | 1/1984 | Briggs | |
| 4,613,744 A | 9/1986 | Fraser | |
| 4,715,559 A | 12/1987 | Fuller | |
| 4,743,740 A | 5/1988 | Adee | |
| 4,801,528 A | 1/1989 | Bennett | |
| 5,267,320 A | 11/1993 | Fukumizu | |
| 5,281,099 A | 1/1994 | Hunter et al. | |
| 5,320,494 A | 6/1994 | Reinfelder et al. | |
| 5,340,279 A | 8/1994 | Cycon et al. | |
| 5,347,586 A | 9/1994 | Hill et al. | |
| 5,364,230 A | 11/1994 | Krauss et al. | |

(Continued)

FOREIGN PATENT DOCUMENTS
EP 0773531 5/1997

OTHER PUBLICATIONS

Douglas E. Melton, R.A. Greiner, "Adaptive Feedforward Multiple-Input, Multiple-Output Active Noise Control", 1992, pp. II-229-232.

(Continued)

*Primary Examiner* — Dwayne J White
(74) *Attorney, Agent, or Firm* — Carlson, Gaskey & Olds, P.C.

(57) ABSTRACT

A thermal management system and method for a miniature gas turbine engine includes a forward cover having a filter portion along an axis of rotation of a gas turbine engine, a first lubrication passage and a second lubrication passage.

21 Claims, 7 Drawing Sheets

U.S. PATENT DOCUMENTS

| | | | |
|---|---|---|---|
| 5,365,594 | A | 11/1994 | Ross et al. |
| 5,386,472 | A | 1/1995 | Pfaff et al. |
| 5,526,292 | A | 6/1996 | Hodgson et al. |
| 5,558,298 | A | 9/1996 | Pla et al. |
| 5,627,896 | A | 5/1997 | Southward et al. |
| 5,629,986 | A | 5/1997 | Shoureshi |
| 5,838,802 | A | 11/1998 | Swinbanks |
| 5,845,236 | A | 12/1998 | Jolly et al. |
| 5,885,059 | A | 3/1999 | Kovalsky et al. |
| 5,940,519 | A | 8/1999 | Kuo |
| 5,954,898 | A | 9/1999 | McKague et al. |
| 6,094,601 | A | 7/2000 | Popovich |
| 6,138,947 | A | 10/2000 | Welsh et al. |
| 6,168,383 | B1 | 1/2001 | Shimizu |
| 6,229,898 | B1 | 5/2001 | Goodman |
| 6,231,308 | B1 | 5/2001 | Kondo et al. |
| 6,426,124 | B2 | 7/2002 | Olster et al. |
| 6,672,538 | B2 | 1/2004 | Millea et al. |
| 6,772,074 | B2 | 8/2004 | Millott et al. |
| 6,856,920 | B2 | 2/2005 | Millott et al. |
| 6,976,829 | B2 | 12/2005 | Kovalsky et al. |
| 7,003,380 | B2 | 2/2006 | MacMartin et al. |
| 7,107,127 | B2 | 9/2006 | Goodman |
| 7,118,340 | B2 | 10/2006 | D'Anna |
| 7,197,147 | B2 | 3/2007 | Millott et al. |
| 7,224,807 | B2 | 5/2007 | Welsh et al. |
| 2007/0028589 | A1* | 2/2007 | Alexander et al. ............ 60/39.08 |

OTHER PUBLICATIONS

International Search Report PCT/US02/05922 dated Jul. 9, 2002.

International Search Report PCT/US02/05845 dated Jul. 15, 2002.

Thomas A. Millott, William A. Welsh, Charles A. Yoerkie Jr., Douglas G. MacMartin, Mark W. Davis, "Flight Test of Active Gear-Mesh Noise Control on the S-76 Aircraft", United Technologies Research Center, East Hartford, CT and Sikorsky Aircraft Corporation, Stratford, CT. Presented at the American Helicopter Society 54th Annual Forum, Washington D.C., May 20-22, 1998, American Helicopter Society, Inc.

Douglas G. MacMartin, Mark W. Davis, Charles A. Yoerkie Jr., William A. Welsh, "Helicopter Gear-Mesh ANC Concept Demonstration", Active '97, Budapest, Hungry, Aug. 1997.

Mark W. Davis, "Refinement and Evaluation of Helicopter Real-Time Self-Adaptive Active Vibration Controller Algorithms", NASA Contractor Report 3821, Aug. 1984.

Christopher N. Bowman and C. Allan Guymon, "Polymerization and Properties of Polymer-Stabilized Ferroelectric Liquid Crystals", Sep. 1999, vol. 22, No. 9, pp. 15-20 and cover page.

Conjugated Polymeric Materials: Opportunities in Electronics, Optoelectronics, and Molecular Electronics, by J.L. Bredas and R.R. Chance; Kluwer Academic Publishers, pp. 115-131.

* cited by examiner

FIG.7

THERMAL MANAGEMENT SYSTEM FOR A GAS TURBINE ENGINE

This invention was made with government support under Contract No. F08635-03-C0002. The government therefore has certain rights in this invention.

BACKGROUND OF THE INVENTION

The present invention relates to a miniature gas turbine engine and, more particularly, to a thermal management system therefor.

Miniature gas turbine or turbojet engines are often utilized in single usage applications such as reconnaissance drones, cruise missiles, decoy and other weapon applications, including air-launched and ground-launched weapon systems. The use of such an engine greatly extends the range of the weapon in comparison to the more conventional solid fuel rocket engine.

To achieve economically feasible extended range expendable propulsion sources for such applications, it is necessary that the miniature gas turbine engines be manufactured relatively inexpensively yet provide the highest degree of starting and operational reliability when launched from air or ground systems. One component that greatly affects mechanical performance and reliability are the high speed bearings which support the rotating turbine machine. Reliability and efficiency of the bearing system is a priority for a successful expendable turbine engine. Such reliability and efficiency of the bearing system may be compromised through inadequate distribution of bearing lubrication.

Current gas turbine bearing systems may employ a relatively complex closed circuit lubrication scheme which may be difficult to maintain during long term storage typical of expendable single use systems.

SUMMARY OF THE INVENTION

A thermal management system for a miniature gas turbine engine according to an exemplary aspect of the present invention includes a forward cover having a filter portion along an axis of rotation of a gas turbine engine, the forward cover defining at least one lubrication passage.

A method of thermal management for a miniature gas turbine engine according to an exemplary aspect of the present invention includes: communicating a cooling airflow through a filter portion of a forward cover along an axis of rotation of a rotor shaft having a compressor wheel, the cooling airflow in communication with a forward bearing and an aft bearing which supports the rotor shaft; directing a lubricant through a first lubricant passage within the forward cover toward the forward bearing; directing the lubricant through a second lubricant passage within the forward cover toward the aft bearing; and merging the cooling airflow into a primary airflow path downstream of the aft bearing, the primary airflow path in communication with the compressor wheel.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
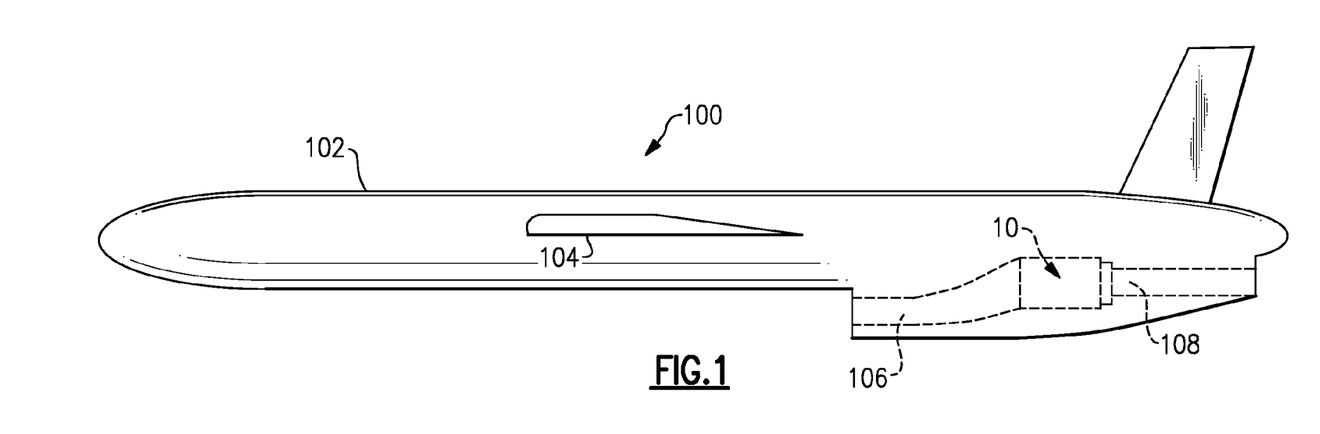
FIG. 1 is a general perspective view of an exemplary vehicle embodiment for use with on embodiment of the present invention.

FIG. 1 illustrates a general schematic view of a vehicle 100 including a miniature gas turbine engine 10 according to the present invention. The vehicle 100 includes a body 102 and one or more aerodynamic surfaces 104. The engine 10 is coupled to, or within, the body 102. A vehicle intake 106 provides air to the engine 10, and an exhaust pipe 108 exhausts the thrust therefrom. The engine 10 of the invention may also be used in other single usage and reusable applications such as reconnaissance drones, cruise missiles, decoys and other weapon and non-weapon applications.

Figure 2:
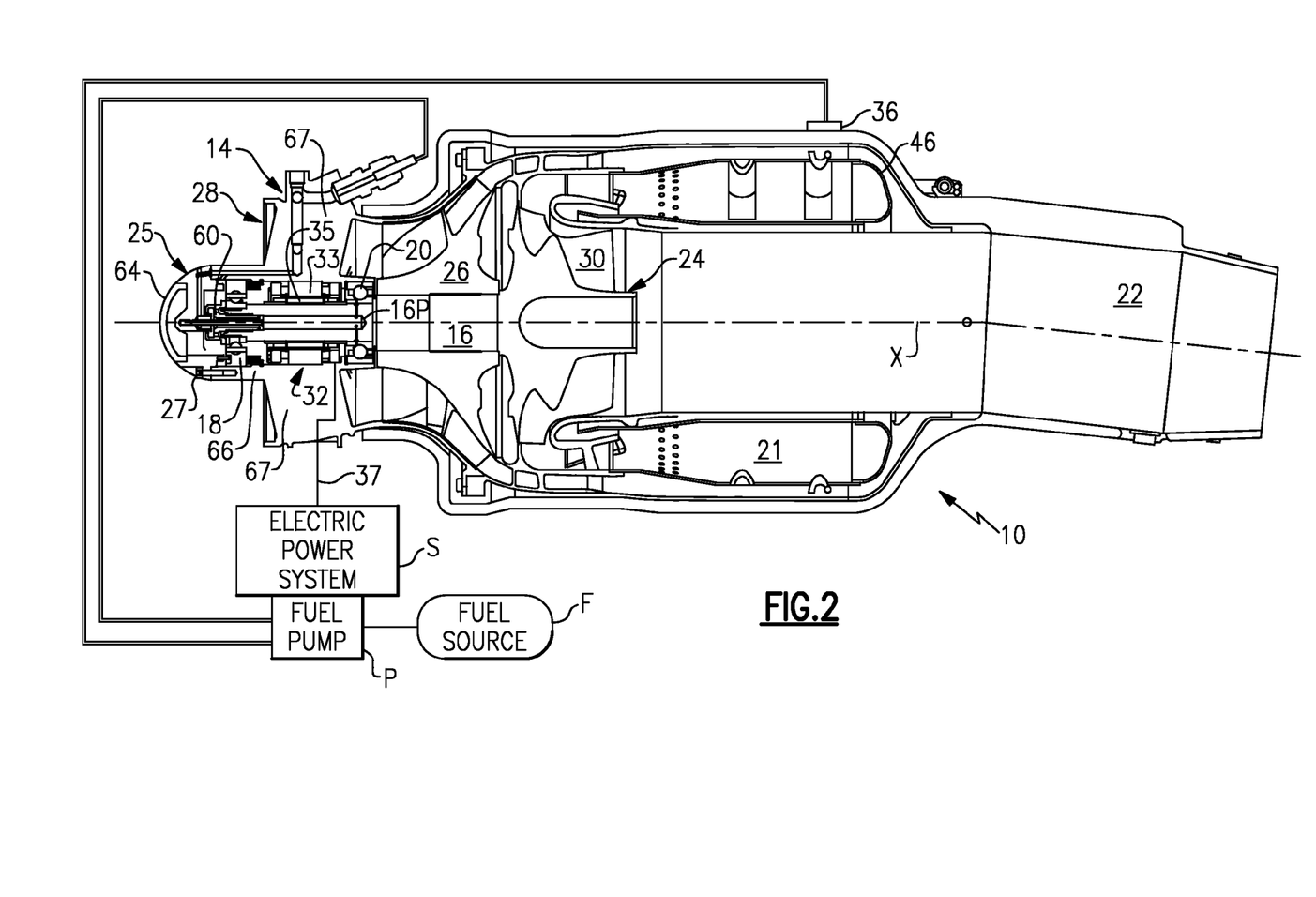
FIG. 2 is a longitudinal sectional view of a gas turbine engine for use with one embodiment of the present invention.

Referring to FIG. 2, the miniature gas turbine engine 10 generally includes a forward housing 14, a rotor shaft 16 rotationally mounted to a forward bearing 18 and an aft bearing 20, a combustion system 21 and an exhaust pipe 22. The rotor shaft 16 rotates about a longitudinal axis X. It should be understood that other forms of rotating turbine machines will also benefit from the present invention.

In the illustrated non-limiting embodiment, a rotor system 24 includes a multiple of compressor blades facing forward toward an intake 28 to define a compressor wheel 26 and a multiple of turbine blades facing rearward toward the exhaust pipe 22 to define a turbine wheel 30 which rotate with the common rotor shaft 16. It should be understood that the compressor wheel 26 and the turbine wheel 30 may be of a unitary or separate component arrangement. The rotor shaft 16 is received in the bearings 18, and 20 and at least partially into a forward cover 25. The forward cover 25 is the forward most portion of the engine 10 and defines an aerodynamically contoured shape which is generally surrounded by the intake 28 to facilitate airflow into the engine 10.

A permanent magnet generator (PMG) 32 is mounted to the rotor shaft 16 aft of the forward bearing 18 to generate electrical power for the engine 10 and other accessories. The PMG 32 includes a stator 33 mounted within a forward housing inner support 66 of the forward housing 14 and a rotor 35 mounted to the rotor shaft 16. An electrical power wire 37 communicates electrical power from the PMG 32 to an electrical power system (illustrated schematically at S).

A fuel pump (illustrated schematically at P) is driven by the electrical power system S to communicate fuel from a source F to an annular combustor 46 through a fuel manifold 36. The fuel is burned at high temperatures within the combustor 46 such that the expanding exhaust gases therefrom are communicated to the turbine wheel 30. The combustor 46 interfaces with the exhaust pipe 22 such that exhaust gases from the combustor liner 46 are directed through the turbine nozzle 44, then the turbine wheel 30 to exit the exhaust pipe 22 and generate a high velocity thrust.

Figure 3:
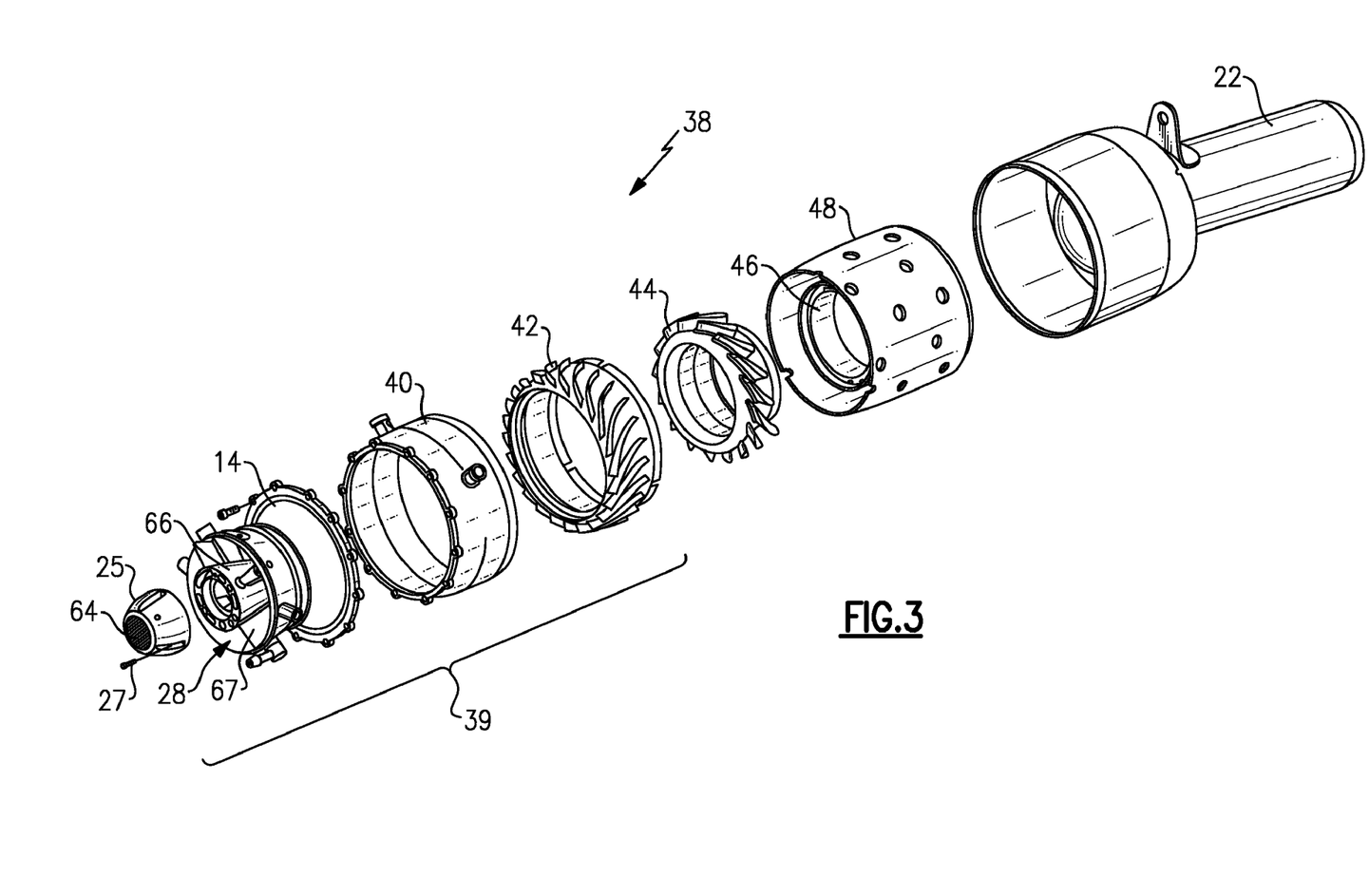
FIG. 3 is a perspective exploded view of the static structure of the gas turbine engine of FIG. 2 separated into its constituent components.

Referring to FIG. 3, a static structure 38 defines a thermal management system 39 of the engine 10. The thermal management system 39 is generally a passive system which receives and directs airflow into a cooling airflow which flows within the static structure 38. To direct a fluid lubricant to further assure reliable thermal management.

The static structure 38 generally includes the forward housing 14, the forward cover 25, a nozzle plate 40, a diffuser 42, a turbine nozzle 44, a combustor liner 46, a combustor housing 48 and the exhaust pipe 22. Each static structure component 14, 25, 40, 42, 44, 46, 48 and 22 may be assembled together (FIG. 2) by one or more relatively low cost fastening techniques such as threaded fasteners, welding, v-band clamps, rivets, or such like. It should also be understood that other static structure arrangements will also be usable herewith.

Figure 4A:
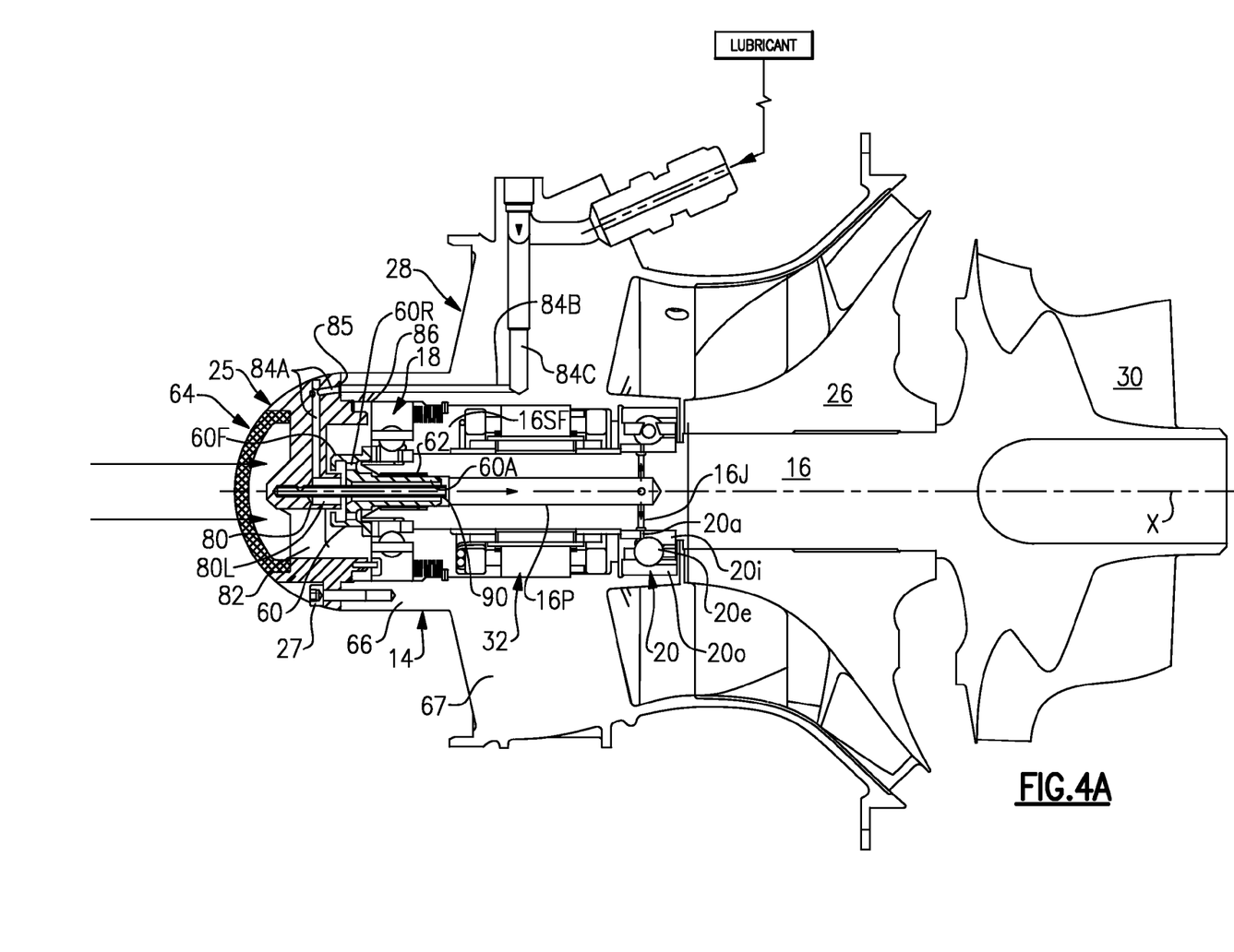
FIG. 4A is an expanded sectional view of a thermal management system for a gas turbine engine.
Figure 4B:
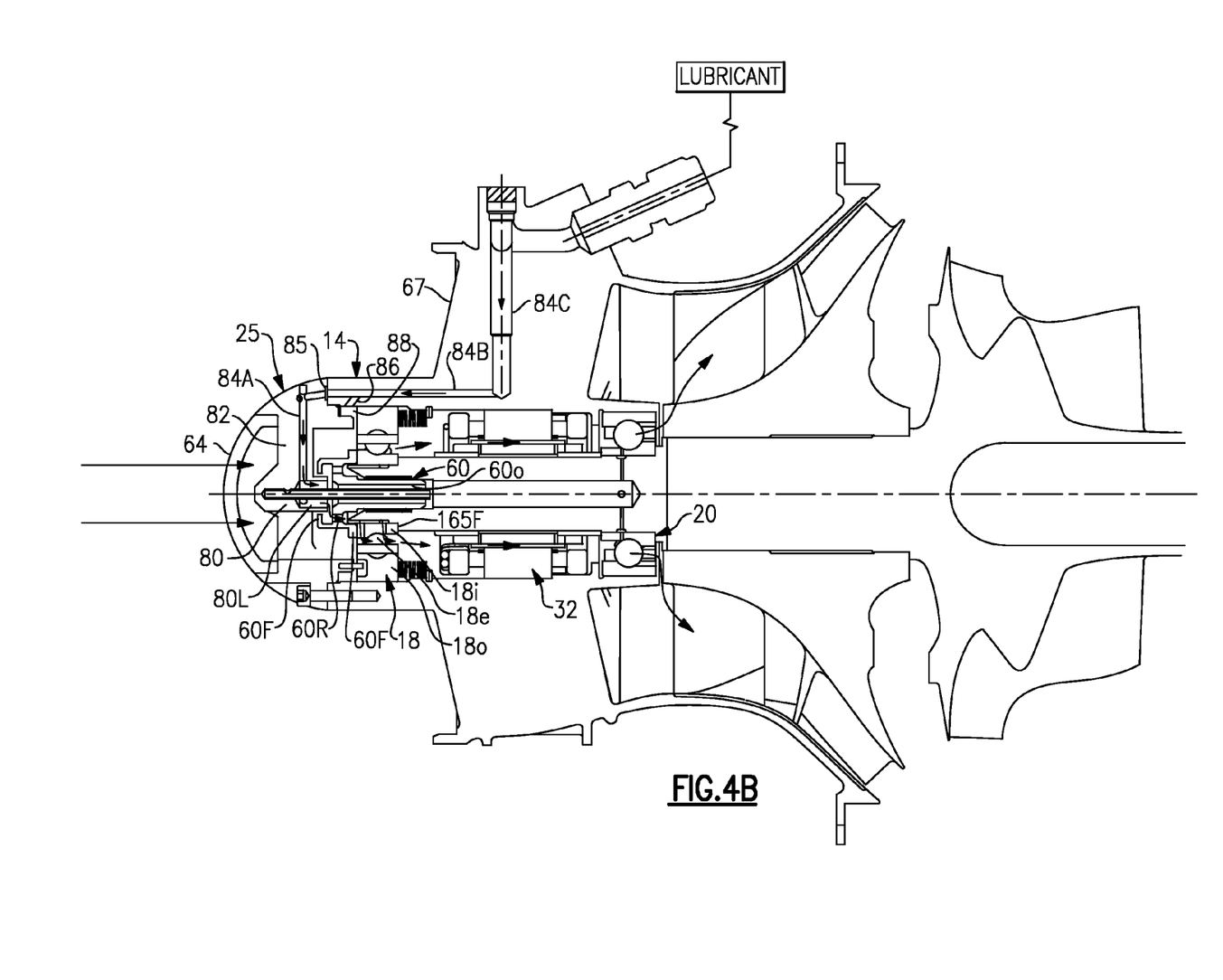
FIG. 4B is an expanded sectional view of the thermal management system of FIG. 4A illustrating a lubricant flow to a forward bearing.

Referring to FIG. 4A, the forward housing 14 defines the intake 28. A forward housing inner support 66 is supported within the intake by a multiple of radial vanes 67 (also illustrated in FIG. 3). The forward housing inner support 66 supports the forward bearing 18 and the aft bearing 20 such that the forward housing 14 provides the primary static structural support for rotation of the rotor shaft 16 and rotational components mounted for rotation therewith.

The forward cover 25 is mounted to the forward housing 14 with cover fasteners 27 or the like. The rotor shaft 16, in one non-limiting embodiment, is mounted with a single fastener 60 which threads within a correspondingly threaded shaft end portion 62 to retain the rotor shaft 16 within the static structure 38. Removal of the forward cover 25 facilitates assembly and disassembly.

Figure 5A:
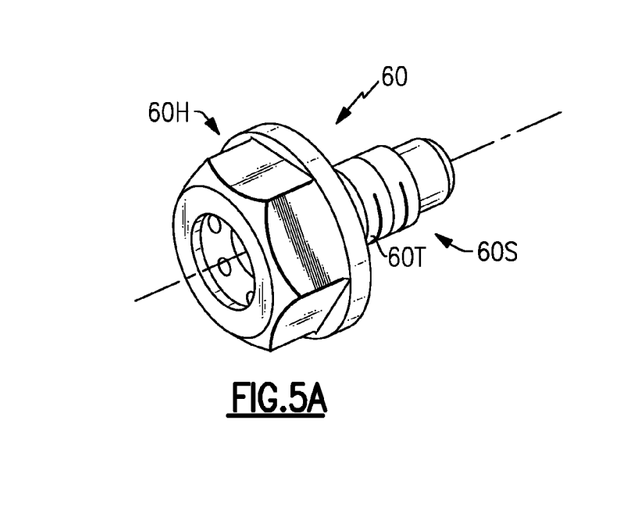
FIG. 5A is an expanded perspective view of a fastener for use with the thermal management system.
Figure 5B:
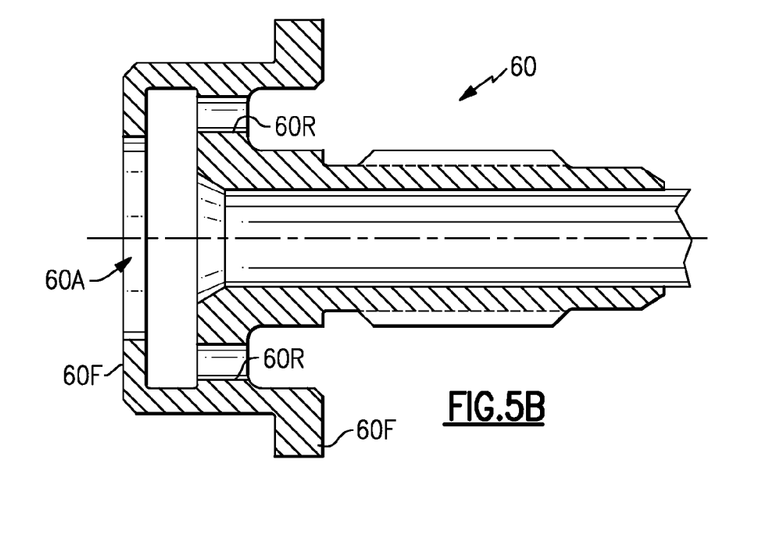
FIG. 5B is a longitudinal sectional view of the fastener of FIG. 5A.

The fastener 60 includes a fastener head 60H and a shank 60S (FIG. 5A). The fastener head 60H defines a polygonal surface to receive a tool such that application of torque threads a threaded shank section 60T into the rotor shaft 16. The fastener 60 (FIG. 5A) includes a central aperture 60A and at least one radial aperture 60R defined about the central aperture 60A (FIG. 5B). The fastener 60 further includes an outward radial flange 60F which provides an axial preload to an inner race 18I to trap the forward bearing 18 between the threaded fastener 60 and a forward rotor shaft step 16SF. The threaded fastener 60 also includes an inward radial flange 60f.

The forward cover 25 includes an air filter portion 64 located generally along the axis X (also illustrated in FIG. 3). The air filter portion 64, in one non-limiting embodiment may be a mesh filter such as that manufactured by EJAY FILTRATION INC, of Riverside, Calif. USA. The air filter portion 64 permits filtered air to flow into the miniature gas turbine engine 10 internals from a source other than along the primary airflow path defined by the intake 28.

Figure 6A:
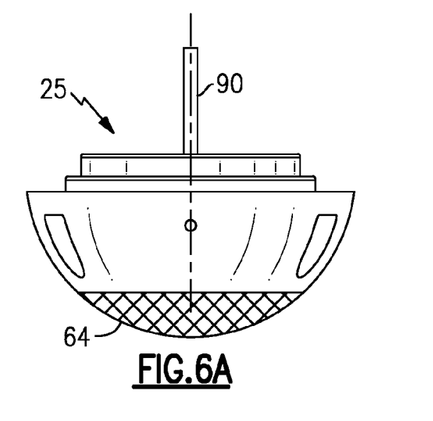
FIG. 6A is an expanded perspective side view of a forward cover.
Figure 6B:
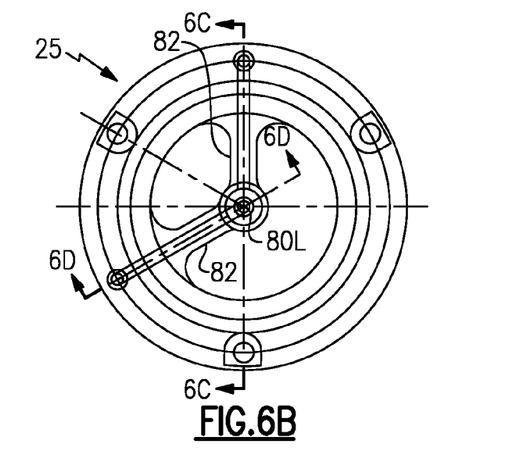
FIG. 6B is a front partial phantom view of the forward cover of FIG. 6A.
Figure 6C:
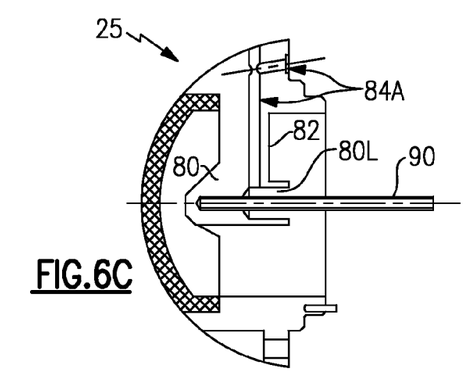
FIG. 6C is a sectional view of the forward cover of FIG. 6A taken along line C-C in FIG. 6B.
Figure 6D:
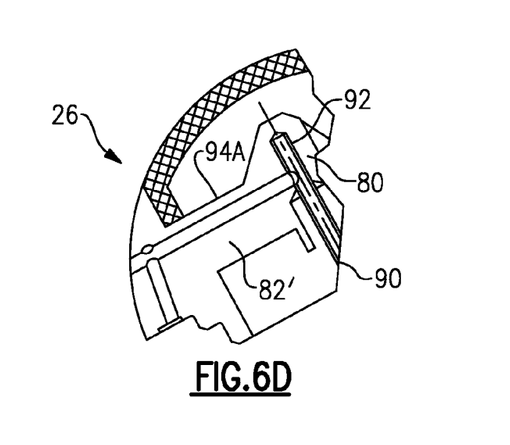
FIG. 6D is a sectional view of the forward cover of FIG. 6A taken along line D-D in FIG. 6B.
Figure 7:
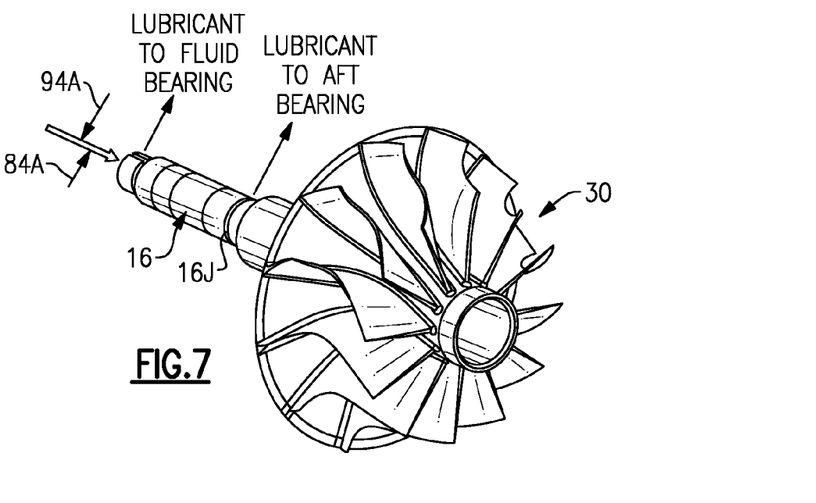
FIG. 7 is a perspective view of a rotor of the schematically illustrating a lubricant flow through the thermal management system of the gas turbine engine.

The forward cover 25 (also illustrated in FIG. 6A) includes a central member 80 having a central lubrication passage 80L defined therein (FIGS. 6B and 6C). The central member 80 is supported by at least one radial cover vane 82 located axially aft of the air filter portion 64 (FIG. 6B). The central member 80 axially may extend at least partial within the inward radial flange 60f of the threaded fastener 60. A radial lubrication passage 84A extends through the radial cover vane 82 and communicates with the central lubrication passage 80L. The lubrication passage 84A communicates lubricant into the central lubrication passage 80L where the lubricant is centrifugally flung outward and captured by the inward radial flange 60f for communication through the at least one radial aperture 60R. From the radial aperture 60R, lubricant is directed into an annulus about the rotor shaft 16 for communication through bearing apertures 18A with the forward bearing inner race 18I. Lubricant is thereby directed to the bearing elements 18E with direct positive pressure. The lubricant is thereby directed to the forward bearing 18.

The radial lubrication passage 84A is in fluid communication with a housing lubrication passage 84B. A seal 85 may be located within the forward cover 25 around an inlet 84A; to the lubricant passage 84 to provide a sealing interface with the forward housing 14.

Lubrication passage 84B may includes a forward raked radial fuel jet 86 which communicated lubricant into a forward galley 88 forward of the forward bearing 18. The forward galley 88 delivers the lubricant around the bearing outer race 18O. The lubricant is thereby directed to the bearing roller elements 18E with direct positive pressure.

Lubrication passage 84B is in fluid communication with a lubrication supply passage 84C which receives a lubricant such as fuel, oil or a mixture. It should be understood that various lubrication passage arrangements may alternatively or additionally be provided.

A tubular member 90 is supported within a pocket 92 formed in the central member 80 along the axis X. The tubular member 90 may be friction fit or otherwise affixed within the pocket 92. The tubular member 90 receives lubricant through a radial lubrication passage 94A which receives lubricant from a housing lubrication passage 94B and a lubrication supply passage 94C as generally described above (FIG. 4C).

Figure 4C:
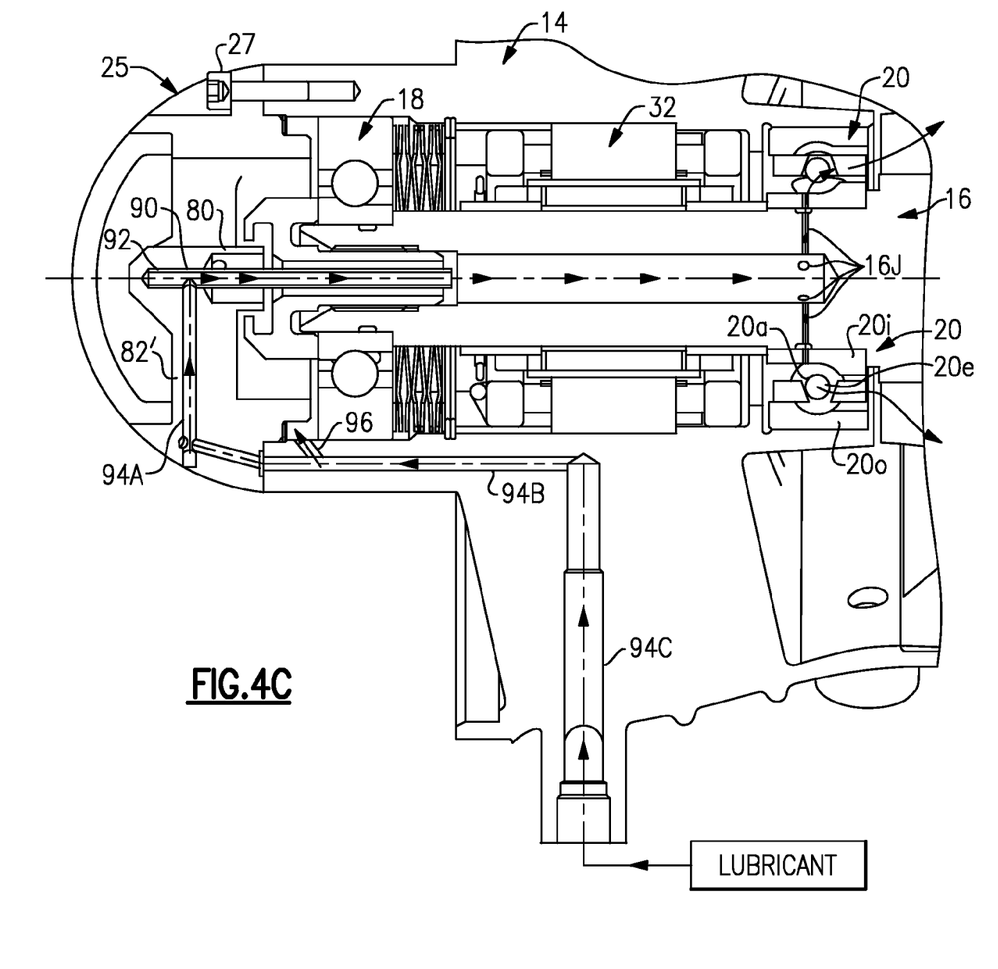
FIG. 4C is another expanded sectional view of the thermal management system, the sectional view radially displaced from the FIGS. 4A and 4B views.

The housing lubrication passage 94B further includes a forward raked radial fuel jet 96 which also communicates lubricant into the forward galley 88 (FIG. 4C). The radial lubrication passage 84A may be located within one radial cover vane 82 (FIGS. 6B and 6C) while radial lubrication passage 92A may be located in a different radial cover vane 82' (FIGS. 6B and 6C).

Lubricant communicated into the tubular member 90 is communicated aft past the forward bearing 18 toward the aft bearing 20 through a central shaft passage 16P in the rotor shaft 16. The lubricant is centrifugally forced to an aft must section of the central shaft passage 16P. Aft radial shaft jets 16J are defined through the rotor shaft 16 at an end section of the central shaft passage 16P. The aft radial shaft jets 16J deliver lubricant through apertures 20A located in the aft bearing inner race 20I. The lubricant is thereby directed to the bearing roller elements 20E with direct positive pressure. It should be understood that a multiple of aft radial jets 16J may communicate with the bearing 20 at a multitude of radial locations thereabout.

The forward cover 25 in the disclosed non-limiting embodiment includes two separate radial lubrication passages 84A, 94A—each passage in a separate cover vane 82—and the air filter portion 64 located generally forward thereof along the axis of rotation of the rotor shaft 16. The two separate radial lubrication passages 84A, 94A communicate lubricant through the respective inner race—18I, 20I of the forward bearing 18 and aft bearing 20. The forward raked radial fuel jets 86, 96 direct lubricant into the forward galley 88 for communication forward of the forward bearing 18. The lubricant is communicated around the forward bearing outer race 18O thereof and into the bearing element 18E.

In operation, the intake 28 which generally surrounds the forward cover 25 intakes a primary airflow for operation of the engine. The thermal management system 39 also receives airflow through the air filter portion 64 of the forward cover 25 where it is filtered for particulate which may result in FOD to the rotational system. From the air filter portion 64, filtered air flows over and through the forward bearing 18, along the rotor shaft 16, over and through the PMG 32, then over and through the aft bearing 20 to provide significant thermal management. Such cooling airflow significantly improves reliability while permitting increased rotor shaft rotation speeds to increase thrust output.

The filtered airflow from the air filter portion 64 is generally contained and directed through the forward housing inner support 66 of the forward housing 14. From the aft bearing 20, the cooling airflow merges with the primary airflow path received from the intake 28 where the combined airflow continues through the compressor wheel 26, and into the combustion system 21 (FIG. 2).

Commensurate therewith, the cooling airflow atomizes and communicates a lubricant such as fuel, oil or a mixture thereof from the source F. The lubricant is communicated from the generally axial housing lubrication passages 84B, 94B into the respective forward raked radial fuel jets 86, 96 to direct lubricant into the forward galley 88 for communication toward the outer race 18O of the forward bearing 18. The filtered airflow atomizes and communicates the lubricant around the outer race 18O and into the bearing element 18E. The lubricant from the forward galley 74 may be at least partially communicated through the bearing element 18E toward the PMG 32. The lubricant which lubricates the bearing element 18E is in direct communication with the cooling airflow through the air filter portion 64. The cooling airflow atomizes and communicates the lubricant aft ward such that the lubricant is essentially sprayed onto the forward bearing, 18, the PMG 32 and the aft bearing 20. Such atomization facilitates reliable operation.

The lubricant is also communicated from the radial lubrication passages 84A, into the central lubrication passage 66L. From the central lubrication passage 66L, the lubricant is centrifugally forced outward where the lubricant is captured by the inward radial flange 60f to direct the lubricant through the at least one radial aperture 60R and toward the inner race 18I of the forward bearing 18. Apertures 18A through the inner race 18I of the forward bearing 18 allow the lubricant to be sprayed into the forward bearing elements 18E.

The lubrication is also communicated through the tubular member 90 past the forward bearing 18, into the aft section of the central shaft passage 16P. Lubricant is communicated through the aft radial fuel jets 16J which deliver the lubricant through the apertures 20A. The aft radial fuel jets 16J are aligned with the apertures 20A in the aft bearing inner race 20I such that the lubricant is sprayed into the aft bearing elements 20E.

The lubricant and cooling airflow is communicated from the aft bearing 20 to merge into the primary airflow and into the combustion system 21. As the lubricant is fuel or a fuel oil mixture, engine efficiency is maintained since the lubricant is ultimately communicated to the combustion system 21 for combustion and thrust generation.

It should be understood that relative positional terms such as "forward," "aft," "upper," "lower," "above," "below," and the like are with reference to the normal operational attitude and should not be considered otherwise limiting.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A thermal management system for a gas turbine engine comprising:
    a forward cover having a filter portion along an axis of rotation of a gas turbine engine, said forward cover at least partially defines a first lubrication passage, a segment of said first lubrication passage is located through a radial cover vane of said forward cover wherein said first lubrication passage defines an annular passage about a second lubrication passage.

2. The thermal management system as recited in claim 1, wherein said annular passage and at least a segment of said second lubrication passage are defined along said axis of rotation.

3. The thermal management system as recited in claim 1, wherein said forward cover is forward of a rotor shaft defined along said axis of rotation, said rotor shaft supported by a forward bearing and an aft bearing.

4. The thermal management system as recited in claim 3, wherein said first lubrication passage is in fluid communication with said forward bearing and a second lubrication passage is in fluid communication with said aft bearing.

5. The thermal management system as recited in claim 1, further comprising a tubular member mounted to said forward cover, said tubular member extends along said axis of rotation.

6. The thermal management system as recited in claim 1, wherein said forward cover is mounted to a forward housing defined about said axis of rotation, said forward cover located forward of a rotor shaft which rotates about said axis of rotation.

7. The thermal management system as recited in claim 1, wherein said forward cover at least partially defines an inner diameter of an annular primary airflow path into said gas turbine engine.

8. The thermal management system as recited in claim 1, further comprising:
    a rotor shaft along said axis of rotation;
    a forward rotor shaft bearing which rotationally supports said rotor shaft; and
    an aft rotor shaft bearing which rotationally supports said rotor shaft, said forward rotor shaft bearing and said aft rotor shaft bearing in communication with a filtered airflow from said filter portion.

9. The thermal management system as recited in claim 8, wherein said forward is cover mounted to a forward housing defined about said axis of rotation, said forward housing having a first housing lubrication passage in communication with said first lubrication passage and a second housing lubrication passage in communication with said second lubrication passage.

10. The thermal management system as recited in claim 8, further comprising a permanent magnet generator (PMG) mounted to said rotor shaft, said PMG mounted between said forward rotor shaft bearing and said aft rotor shaft bearing.

11. The thermal management system as recited in claim 8, wherein an inner race of said forward bearing includes a multiple of forward radial apertures and an inner race of said aft bearing includes a multiple of aft radial apertures.

12. A miniature gas turbine engine comprising:
a rotor shaft defined along an axis of rotation;
a compressor wheel mounted to said rotor shaft;
a forward bearing which rotationally supports said rotor shaft, said forward bearing comprising an inner race having a multiple of radial apertures; and
an aft bearing which rotationally supports said rotor shaft, said forward bearing and said aft rotor shaft bearing in communication with a filtered airflow from said filter portion, said aft bearing comprising an inner race having a multiple of radial apertures; and
a forward cover having a filter portion along an axis of rotation of a gas turbine engine, said forward cover defining a first lubrication passage in communication with said multiple of radial apertures in said inner race of said forward bearing and a second lubrication passage in communication with said multiple of radial apertures in said inner race of said aft bearing.

13. The miniature gas turbine engine as recited in claim 12, further comprising a forward housing defined about said axis of rotation, said forward housing defining a first housing lubrication passage in communication with said first lubrication passage and a second housing lubrication passage in communication with said second lubrication passage, a first forward raked radial fuel jet in communication with said first housing lubrication passage and a second forward raked radial fuel jet in communication with said second housing lubrication passage, said first forward raked radial fuel jet and said second forward raked radial fuel jet in communication with a forward shaft galley adjacent said forward bearing.

14. A method of thermal management for a miniature gas turbine engine comprising:
communicating a cooling airflow through a filter portion of a forward cover along an axis of rotation of a rotor shaft having a compressor wheel, the cooling airflow in communication with a forward bearing and an aft bearing which supports the rotor shaft;
directing a lubricant through a first lubricant passage within the forward cover toward the forward bearing;
directing the lubricant through a second lubricant passage within the forward cover toward the aft bearing; and
merging the cooling airflow into a primary airflow path downstream of the aft bearing, the primary airflow path in communication with the compressor wheel.

15. A method as recited in claim 14, further comprising:
communicating a primary airflow along the primary airflow path from an intake defined at least partially about the periphery of the forward cover.

16. A thermal management system for a gas turbine engine comprising:
a forward cover having a filter portion along an axis of rotation of a gas turbine engine, said forward cover at least partially defines a first lubrication passage, a segment of said first lubrication passage is located through a radial cover vane of said forward cover wherein said forward cover is forward of a rotor shaft defined along said axis of rotation, said rotor shaft supported by a forward bearing and an aft bearing and wherein said first lubrication passage is in fluid communication with said forward bearing and a second lubrication passage is in fluid communication with said aft bearing.

17. A thermal management system for a gas turbine engine comprising:
a forward cover having a filter portion along an axis of rotation of a gas turbine engine, said forward cover at least partially defines a first lubrication passage, a segment of said first lubrication passage is located through a radial cover vane of said forward cover,
a rotor shaft along said axis of rotation;
a forward rotor shaft bearing which rotationally supports said rotor shaft; and
an aft rotor shaft bearing which rotationally supports said rotor shaft, said forward rotor shaft bearing and said aft rotor shaft bearing in communication with a filtered airflow from said filter portion
wherein said forward cover is mounted to a forward housing defined about said axis of rotation, said forward housing having a first housing lubrication passage in communication with said first lubrication passage and a second housing lubrication passage in communication with said second lubrication passage.

18. The thermal management system as recited in claim 17, wherein said first housing lubrication passage and said second housing lubrication passage are each located within a respective vane of said forward housing.

19. The thermal management system as recited in claim 17, further comprising a first forward raked radial fuel jet in communication with said first housing lubrication passage and a second forward raked radial fuel jet in communication with said second lubrication passage, said first forward raked radial fuel jet and said second forward raked radial fuel jet in communication with a forward shaft galley adjacent said forward bearing.

20. A thermal management system for a gas turbine engine comprising:
a forward cover having a filter portion along an axis of rotation of a gas turbine engine, said forward cover at least partially defines a first lubrication passage, a segment of said first lubrication passage is located through a radial cover vane of said forward cover,
a rotor shaft along said axis of rotation;
a forward rotor shaft bearing which rotationally supports said rotor shaft; and
an aft rotor shaft bearing which rotationally supports said rotor shaft, said forward rotor shaft bearing and said aft rotor shaft bearing in communication with a filtered airflow from said filter portion wherein said forward is cover mounted to a forward housing defined about said axis of rotation, said forward housing having a first housing lubrication passage in communication with said first lubrication passage and a second housing lubrication passage in communication with said second lubrication passage and wherein an inner race of said forward bearing includes a multiple of forward radial apertures and an inner race of said aft bearing includes a multiple of aft radial apertures.

21. The thermal management system as recited in claim 20, wherein said rotor shaft includes a central shaft passage having a multiple of radial fuel jets in communication with said multiple of aft radial apertures.

* * * * *